Oct. 25, 1949.  R. J. WATERBURY ET AL  2,485,794
TRUCK CAB MOUNT
Filed Nov. 18, 1946  3 Sheets-Sheet 1
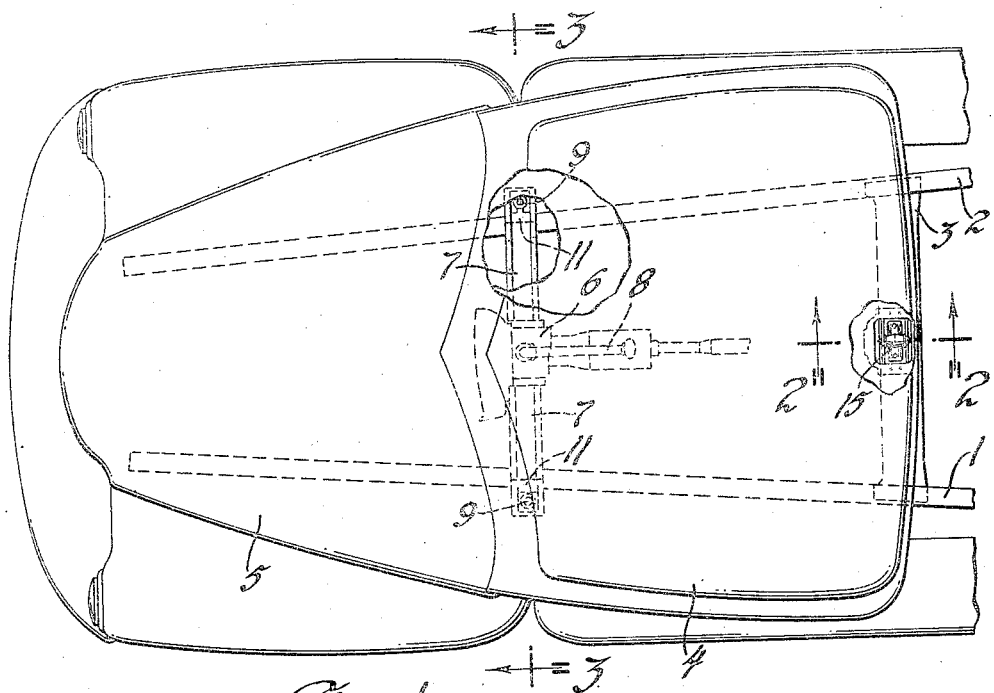
Fig. 1
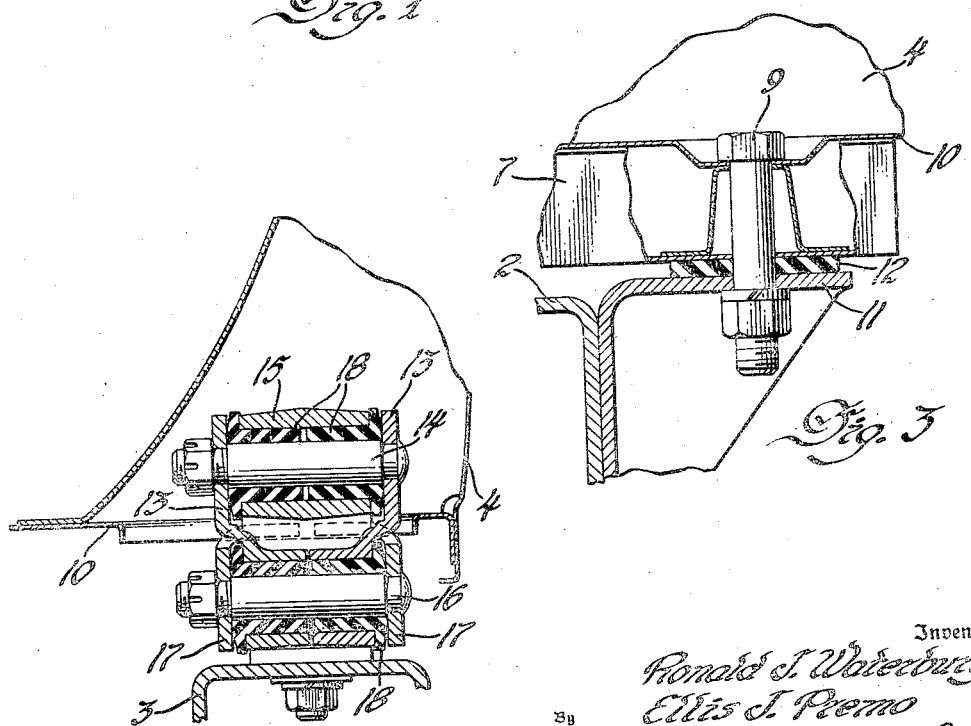
Fig. 3
Fig. 2
Inventors
Ronald J. Waterbury &
Ellis J. Premo
By Spencer, Willits, Helwig & Baillio
Attorneys

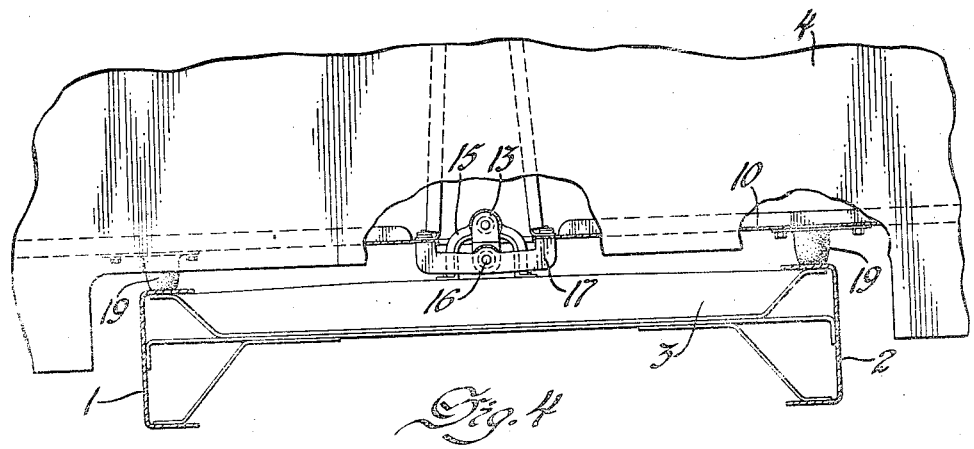
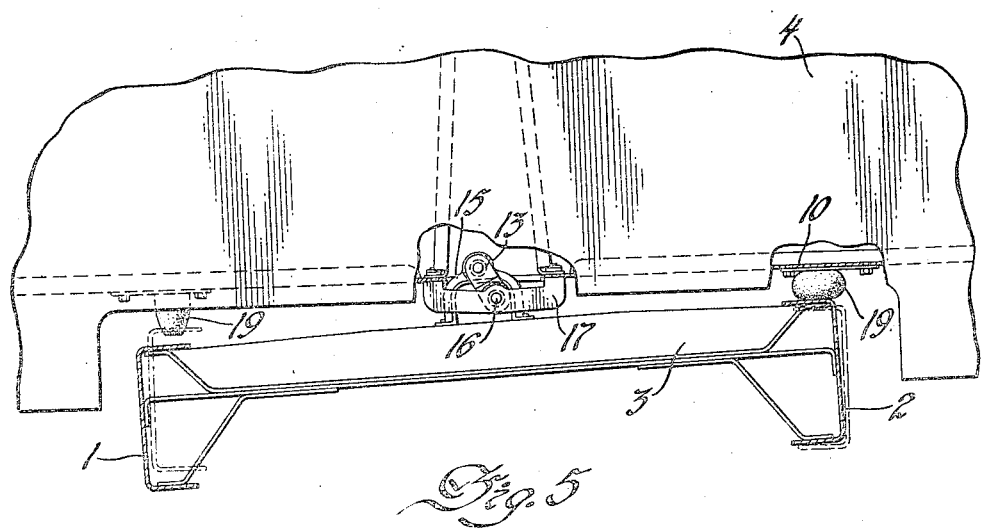

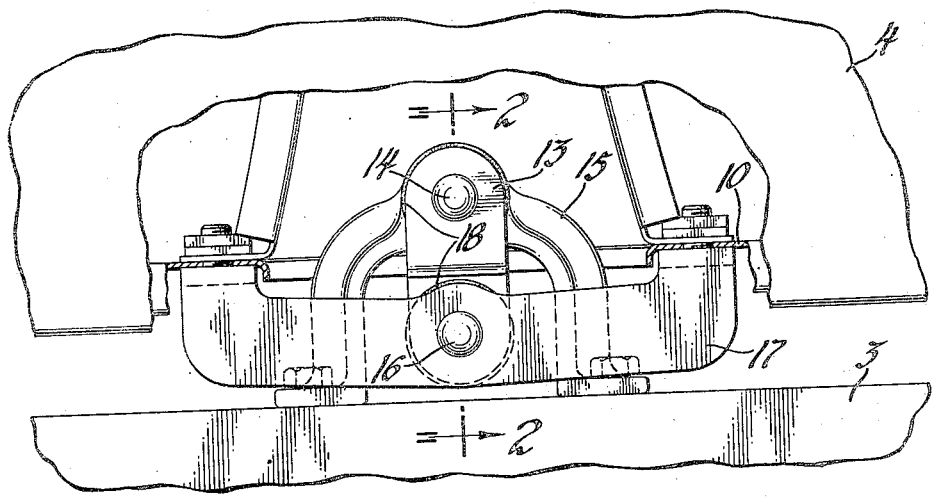
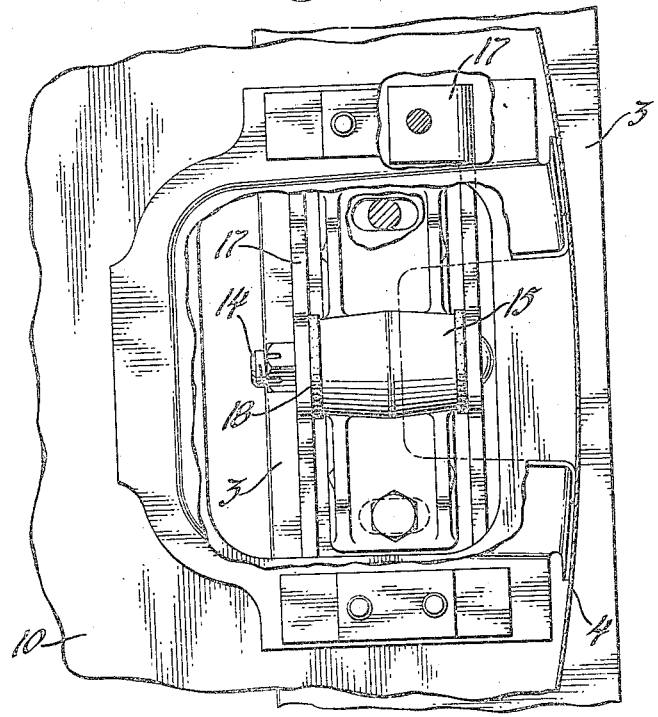

Patented Oct. 25, 1949

2,485,794

UNITED STATES PATENT OFFICE 2,485,794

TRUCK CAB MOUNT

Ronald J. Waterbury, Birmingham, and Ellis J. Premo, Detroit, Mich., assignors to General Motors Corporation, Detroit, Mich., a corporation of Delaware Application November 18, 1946, Serial No. 710,508

4 Claims. (Cl. 296—35)

1

The twisting or weaving of the side rails of a vehicle chassis frame due to road surface irregularities which compel one or more wheels to be elevated differently from other wheels has prompted the practice of mounting the body and particularly an operator's cab, in the case of trucks, in a manner to minimize the imposition of damaging stress on the cab structure. Conventional truck chassis have an enclosed operator's cab directly behind the engine and which is separate from and independent of the load carrying body at the rear of the vehicle. The pay load or goods carrying body tends to stiffen the back of the frame, but in any event the frame weave deflection is most pronounced in the region midway of the front and rear wheels, or in the vicinity of the rear cab wall.

It is here proposed to relieve the cab structure from twisting strain by mounting it in a manner that frame weave can occur without substantial disturbance to a firm cab position with the latter being determined by forward connection with the frame closely adjacent to the engine supported in the frame so that there will be a minimum of forced relative movement between the operator's position and the engine controls which project into his cab. Thus the entire cab can remain fairly fixed or steady in relation to the forward portion of the frame regardless of ordinary frame distortion occurring under and rearwardly of the cab. In addition to strain relief on the cab structure, there will be a strain relief for the operator by freeing him of sensation or appreciable perception of frame weave since both his seat and his controls tend to remain in given relation to the structure ahead of the cab and within the operator's sight and feel.

For a detailed explanation of the invention reference will be made to the accompanying drawing wherein:

Figure 1 is a plan view with parts broken away of the forward portion of a motor truck;

Figure 2 is a section on line 2—2 of either Figure 1 or Figure 6;

Figure 3 is a section on line 3—3 of Figure 1;

Figures 4 and 5 are transverse sections through the chasis immediately behind the cab and illustrate, respectively, the normal relation of the parts and their relation at an extreme frame weave; and, Figures 6 and 7 are enlarged views in elevation and plan, respectively, of the motion accommodating connection at the rear of the cab.

In the drawing, the chassis frame side rails are indicated by the numerals 1 and 2 and these are joined by a series of longitudinally spaced, transverse members, one of which is shown at 3 directly under the rear of the operator's cab 4. Rearwardly from the cab the chassis frame extends to whatever distance is called for for supporting the pay load. The front of the cab 4 overlies a portion of the power plant mounted on the chassis with its major portion covered by the usual hood 5 ahead of the cab. That portion of the power plant located under the cab floor is indicated by dotted lines in Figure 1 as including the transmission gear box 6 braced in the frame by lateral arms 7—7 with its gear shift control lever 8 projecting upwardly into the cab interior for convenient access from the operator's seat. The usual clutch and brake levers, as well as the steering column extend into the cab but are omitted from the drawing for the sake of simplicity.

In order that the cab may be firmly mounted with reference to the forward portion of the chassis frame its forward end is tied down at two transversely spaced points adjacent the respective side rails 1 and 2. Each connection, as shown in Figure 3, comprises a hold-down nut and bolt 9 passing through the cab floor 10 and a frame bracket 11 with an interposed spaced pad 12 of sound deadening insulation, such as rubber or other suitable material. Further to tie down and locate the cab with reference to steadied relation at the forward end of the vehicle, and to reduce displacement and racking strains incident thereto when the chassis frame in its intermediate region undergoes twist there has been devised a swinging shackle structure for location on the vehicle longitudinal center line as a single connection for the rear of the cab and which, in cooperating with a pair of transversely spaced elastic limit stops on opposite sides, suspends the weight of the cab while accommodating forced relative movement of the chassis under the cab.

In the illustrated arrangement a swinging link is made up of a pair of members 13—13 whose upper ends are spaced apart by and carry between them a trunnion pin 14 extending through an eye of a yoke or inverted U-shaped bracket 15 bolted or otherwise secured to the chassis frame member 3 in straddling relation to the cooperating abutting eyes on the lower ends of the swinging links and which receive a trunnion pin 16 carried by and extending between a pair of side bars or brackets 17 fastened to and dependent from the cab floor 10 in spaced apart relation on opposite sides of the yoke 15. By preference the shackle pivots include bushings 18 of rubber or other like material to insulate the parts and to enable relative movement by deformation. Both trunnion pins have their opposite ends of reduced diameter to project through and space the parts they fasten, one end of each pin being permanently joined by swaging its tip over its associated part and the other end being screw threaded to receive a removable nut for detachably holding the other part.

It is to be noted that the spaced apart arms 17 of the dependent cab bracket provide an opening into which projects the upstanding frame yoke 15 and that the interfit and overlap of these parts in relation to each other and cooperating trunnion and spacer pins not only afford a compact assembly as well as a limit to the extent of relative swinging shackle motion, but also afford an effectual interlock as a safety factor in the event of abnormal wear and looseness or accidental breakage or failure of one or more parts. The weight of the cab is suspended from the frame through the swinging coupling but in addition a part of the weight is transmitted through either or both of a pair of side bumpers 19 each comprising a body of rubber or the like fixed on the under side of the cab so as to rest or bottom on an adjacent chassis rail 1 or 2 as the case may be.

In the absence of frame twist the normal positioning of the parts at the rear of the cab will be substantially as shown in Figure 4. Twisting of the frame so that one side rail rises and the other falls can be accommodated without corresponding displacement of the cab since the shackle pivot joints freely yield to permit the movement. It will tend to deflect one of the rubber bumpers or cushions as can be seen in Figure 5 illustrating an extreme of relative frame deflection with the frame shifted laterally and the swinging link tilted to the limit provided by the straddle yoke. Normally, of course, the cab weight suspended by the shackle will serve to maintain the link in vertically disposed centered position.

It is to be understood also that although the invention has been described with specific reference to a particular embodiment thereof, it is not to be so limited, since changes or alterations therein may be made which are within the full intended scope of this invention as defined by the appended claims.

We claim:

1. In a motor truck having a chassis mounting a power plant in the forward portion thereof and supporting an operator's cab over at least a portion of the power plant, power plant control mechanism projecting into said cab, means fastening the cab substantially fixedly to the chassis in the region of said control mechanism, and means movably joining the rear of the cab to the chassis including a pair of longitudinally spaced brackets fixed to and dependent from the cab, a longitudinally disposed trunnion pin joined to both brackets and projected across the space therebetween, a U-shaped bracket straddling said trunnion pin and having its legs fixed to the chassis and projected upwardly therefrom into the space between the first mentioned brackets and a swinging shackle link trunnioned at its upper end on the U-shaped bracket and at its lower end on said trunnion pin.

2. In a motor vehicle having the control mechanism on its chassis carried power plant projecting into the operator's cab, a cab mounting system including means to locate the cab substantially immovably on the chassis in the region of said control mechanism, a swinging shackle spaced from the said means and arranged to accommodate limited relative movement between the chassis and cab, an upwardly projected yoke carried by the chassis and trunnioned to one end of the shackle near the chassis longitudinal center line, a cab carried member embracing opposite sides of the yoke and having trunnioned connection with the other shackle end, and a pair of motion limit stops between the cab and chassis and on opposite sides transversely of the shackle trunnion axes.

3. The structure of claim 2 wherein said limit stops embody elastic cushions which offer increasing resistance to deflection.

4. In a motor vehicle having a frame and a body, transversely spaced supporting connections between one end of the body and the frame, a pair of longitudinally spaced brackets at the other end of the body, a swinging shackle pivoted at one end in the space between said brackets, a frame carried yoke projecting into said bracket space in straddle relation to the shackle pivot and a pivotal connection between the yoke and said shackle.

RONALD J. WATERBURY.
ELLIS J. PREMO.

REFERENCES CITED

The following references are of record in the file of this patent:

UNITED STATES PATENTS

| Number | Name | Date |
|---|---|---|
| 914,111 | Buckwalter | Mar. 2, 1909 |
| 1,667,204 | Hughes | Apr. 24, 1928 |
| 1,861,712 | Morrison | June 7, 1932 |
| 2,100,371 | Bachman | Nov. 30, 1937 |
| 2,171,947 | Parker | Sept. 5, 1939 |

FOREIGN PATENTS

| Number | Country | Date |
|---|---|---|
| 497,189 | Germany | May 5, 1930 |
| 502,600 | France | Feb. 25, 1920 |
| 513,667 | Great Britain | Oct. 18, 1939 |
| 573,590 | France | Mar. 13, 1924 |
| 575,947 | France | May 2, 1924 |